H. B. MORRISON.

Elbow Joint for Stove Pipes

No. 3,704.

Reissued Nov. 2, 1869.

Witnesses:

R. F. Osgood.

Benny Santoorhis.

Inventor:

H. B. Morrison.

By J. Fraser & Co.

Attys.

N. PETERS, Photo-Lithographer, Washington, D. C.

UNITED STATES PATENT OFFICE.

H. B. MORRISON, OF LEROY, NEW YORK, FOR HIMSELF, AND CAROLINE L. MORRISON, ASSIGNEE, BY MESNE ASSIGNMENTS, OF H. B. MORRISON.

STOVE-PIPE ELBOW.

Specification forming part of Letters Patent No. 83,401 dated October 27, 1868; Reissue No. 3,704, dated November 2, 1869.

*To all whom it may concern:*

Be it known that H. B. MORRISON, of Le Roy, in the county of Genesee and State of New York, did invent a certain new and useful Improvement in Elbow-Joints for Stove, Hot-Air, and other Pipes, of which we, H. B. MORRISON and CAROLINE L. MORRISON, of Le Roy, aforesaid, are sole owners; and we do hereby declare that the following is a full and exact description thereof, reference being had to the accompanying drawings, making part of this specification, in which—

Figure 1:
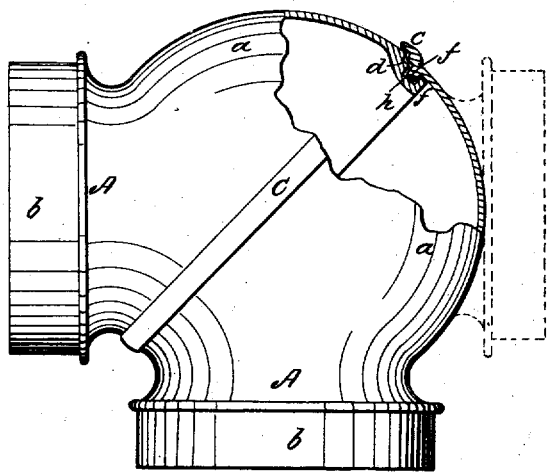
Figure 2:
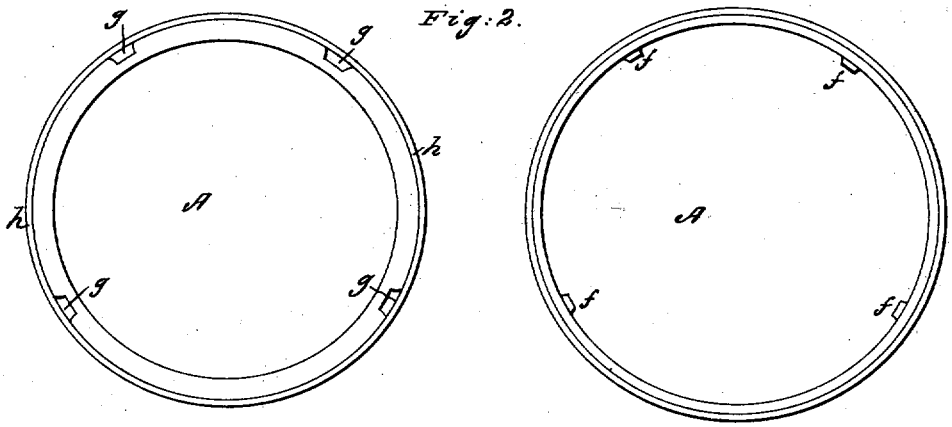

Figure 1 is an elevation of the elbow, with a part in section to show the joint; Fig. 2, a view of the parts separated, showing the joint arrangement.

Like letters of reference indicate corresponding parts in both figures.

This invention consists, essentially, in forming an elbow with a connecting and disconnecting joint, whereby the parts may be applied or separated at pleasure or turned to any position from a right angle to a straight line.

It also consists in making the connecting ends of the parts composing the elbow enlarged, so as to form a comparatively large chamber, to accommodate the volume which passes through; and it further consists in the construction and arrangement of the joint proper, the whole as hereinafter set forth.

In the drawings, A A indicate the two arms which constitute the elbow, being preferably composed of swells *a a*, which, when joined together, form an enlarged chamber, and having flanges *b b* for the connection of a straight section of pipe. If desired, the swells *a* may be dispensed with and the elbow made straight. The angular joint between these parts is situated obliquely, running back from the angle of the elbow and extending circularly around the chamber, and it is formed by a tongue, *c*, of one part and groove *d* of the other, which overlap in such a manner as to make a close fit. The connection of the joint is made by three or more lugs, *f f f*, of the one part striking into three or more notches, *g g g*, of the other part, and then turning in a groove, *h*, which holds them in place, except when in coincidence with the notches.

By the construction above described the parts composing the elbow are capable of applying together or separating at any time. This is of importance frequently in adjusting the pipe in difficult positions or in contracted places. All other elbows with which we are acquainted are entire, and cannot be separated, as above described.

By this construction, also, the arms A A can be turned or adjusted to any position from a right angle to a straight length—or, in other words, they can be made to assume a right angle, any obtuse angle, or a straight position. This result is owing to the loose joint between the parts, which allows either to be turned. This feature we also believe to be new in elbows for pipes. It is obviously of much importance in accommodating to any turn of the main pipe without the necessity of making a special elbow for the purpose, which has been heretofore done.

As a straight length, the device is of frequent use in filling out short distances, and it may also be used to give an ornamental form to the pipe by placing at regular intervals apart.

The coupling, by means of the lugs *f*, notches *g*, and annular groove *h*, enables this turning action to be performed and at the same time holds the parts of the elbow in place at all times, except when turned to a specified position, when they unlock. The overlapping tongue and groove *c d* are also of importance in making a close joint.

What we claim is—

1. A pipe-elbow made with a suitable connecting and disconnecting joint, substantially as set forth.

2. A pipe-elbow having the central enlargement, *a a*, and its joint so formed and connected that the arms or ends of said elbow may be turned in any position from right angle to a straight length, as herein described.

3. A pipe-elbow having a suitable connecting and disconnecting joint, in which the central space, *a a*, is made enlarged, to form a chamber, substantially as described.

4. The connecting and disconnecting joint formed by the overlapping tongue and groove *c d*, and located obliquely from the angle of the elbow centrally around the chamber, substantially as described.

5. The combination and arrangement of the lugs *f*, notches *g*, groove *h*, and tongue and groove *c d*, the whole constituting the joint, as herein described.

Witness our signatures this 8th day of July, 1869.

H. B. MORRISON.
C. L. MORRISON.

Witnesses:
R. F. OSGOOD,
GEO. W. MIATT.